US012050114B2

(12) United States Patent
Schleicher et al.

(10) Patent No.: US 12,050,114 B2
(45) Date of Patent: Jul. 30, 2024

(54) METHOD AND SYSTEM FOR DETECTION OF ROLL SENSOR BIAS

(71) Applicant: Deere & Company, Moline, IL (US)

(72) Inventors: Tyler D. Schleicher, Ankeny, IA (US); Joel D. Hergenreter, Elkhart, IA (US)

(73) Assignee: Deere & Company, Moline, IL (US)

( * ) Notice: Subject to any disclaimer, the term of this patent is extended or adjusted under 35 U.S.C. 154(b) by 580 days.

(21) Appl. No.: 16/946,803

(22) Filed: Jul. 7, 2020

(65) Prior Publication Data

US 2021/0278210 A1 Sep. 9, 2021

Related U.S. Application Data

(60) Provisional application No. 62/987,100, filed on Mar. 9, 2020.

(51) Int. Cl.
*G01C 9/08* (2006.01)
*B60W 40/112* (2012.01)
*B60W 50/06* (2006.01)
*G01C 25/00* (2006.01)

(52) U.S. Cl.
CPC ............. *G01C 9/08* (2013.01); *B60W 40/112* (2013.01); *B60W 50/06* (2013.01); *G01C 25/005* (2013.01)

(58) Field of Classification Search
CPC ...... G01C 9/08; G01C 25/005; B60W 40/112; B60W 50/06; G05B 23/0235; G05B 2219/2637; G05B 23/0283; A01B 69/007
USPC ........................................................ 73/1.75
See application file for complete search history.

(56) References Cited

U.S. PATENT DOCUMENTS

| 7,225,060 | B2 | 5/2007 | O'Connor et al. |
| 8,589,015 | B2 | 11/2013 | Willis et al. |
| 2003/0182041 | A1* | 9/2003 | Watson ............. B60R 21/01336 701/45 |
| 2013/0160543 | A1 | 6/2013 | Kontz et al. |
| 2013/0185018 | A1* | 7/2013 | Sheng ...................... G01B 7/30 702/153 |

(Continued)

FOREIGN PATENT DOCUMENTS

| EP | 1627766 A2 * | 2/2006 | ............. B60K 31/04 |
| EP | 3012585 A1 | 4/2016 | |

OTHER PUBLICATIONS

English translation for EP-1627766-A2 (Year: 2006).*

(Continued)

*Primary Examiner* — Lee E Rodak
*Assistant Examiner* — Byung Ro Lee

(57) ABSTRACT

A roll sensor is configured to detect a first roll angle at a corresponding first point of a path plan of a vehicle, or its implement, based on the estimated current position. A roll sensor is configured to detect a second roll angle at a corresponding second point of a path plan of a vehicle, or its implement, based on the estimated current position. A data processor is configured to determine a roll angle delta or difference between the first roll angle and the second roll angle. If the roll angle delta is greater than a reference roll value, the roll angle delta is evaluated over an evaluation period. For example, if the roll angle is greater than the reference roll value for equal to or greater than a target percentage or target ratio for the evaluation period, the data processor is configured to designate the roll angle sensor for possible recalibration.

25 Claims, 4 Drawing Sheets

(56) References Cited

U.S. PATENT DOCUMENTS

2016/0290825 A1* 10/2016 Brenner ................ G01S 19/54
2018/0164126 A1    6/2018 Schubert et al.
2019/0256102 A1*  8/2019 Schleicher ............ E02F 9/2045
2020/0081030 A1    3/2020 Currier

OTHER PUBLICATIONS

Extended European Search Report and Written Opinion issued in European Patent Application No. 21155785.5, dated Aug. 2, 2021, in 10 pages.

* cited by examiner

# METHOD AND SYSTEM FOR DETECTION OF ROLL SENSOR BIAS

RELATED APPLICATION

This document (including the drawings) claims priority and the benefit of the filing date based on U.S. provisional application No. 62/987,100, filed Mar. 9, 2020, under 35 U.S.C. § 119 (e), where the provisional application is hereby incorporated by reference herein.

FIELD OF DISCLOSURE

This disclosure relates to a method for detection of roll sensor bias.

BACKGROUND

Some prior art vehicles have roll sensors, such as accelerometers or gyroscopes, for detecting the roll angle or roll motion data that can be used for guidance or control of off-road work vehicles. In certain prior art, roll sensors can be calibrated on a regular basis after expiration of a timer, for example. However, it is possible that a certain roll sensor may drift or deviate significantly from accurate measurements of roll angle or roll motion data between such regular calibrations, such as if a satellite navigation receiver with an integral roll sensor is moved from one vehicle to another. Accordingly, there is a need for a method and system for detection of roll sensor bias and compensation for roll sensor bias.

SUMMARY

In accordance with one embodiment, a method and system for detection of roll sensor bias comprises a location-determining receiver or other sensor for estimating one or more current positions (e.g., and yaw changes) of a vehicle or its implement. A roll sensor is configured to detect a first roll measurement at a corresponding first point of a path plan of a vehicle, or its implement, based on one estimated current position. A roll sensor is configured to detect a second roll measurement at a corresponding second point of a path plan of a vehicle, or its implement, based on another estimated current position (e.g., if the estimated yaw change is greater than a target yaw angular displacement). An electronic data processor is configured to determine a roll measurement delta or difference between the first roll measurement (e.g., first roll angle) and the second roll measurement (e.g., second roll angle). If the roll measurement delta (e.g., roll angle delta) is greater than a reference roll value, the roll angle delta is evaluated over an evaluation period. For example, if the roll measurement delta is greater than the reference roll value for equal to or greater than a target percentage or target ratio for the evaluation period, the data processor is configured to designate the roll angle sensor for possible recalibration.

DETAILED DESCRIPTION

Figure 1A:
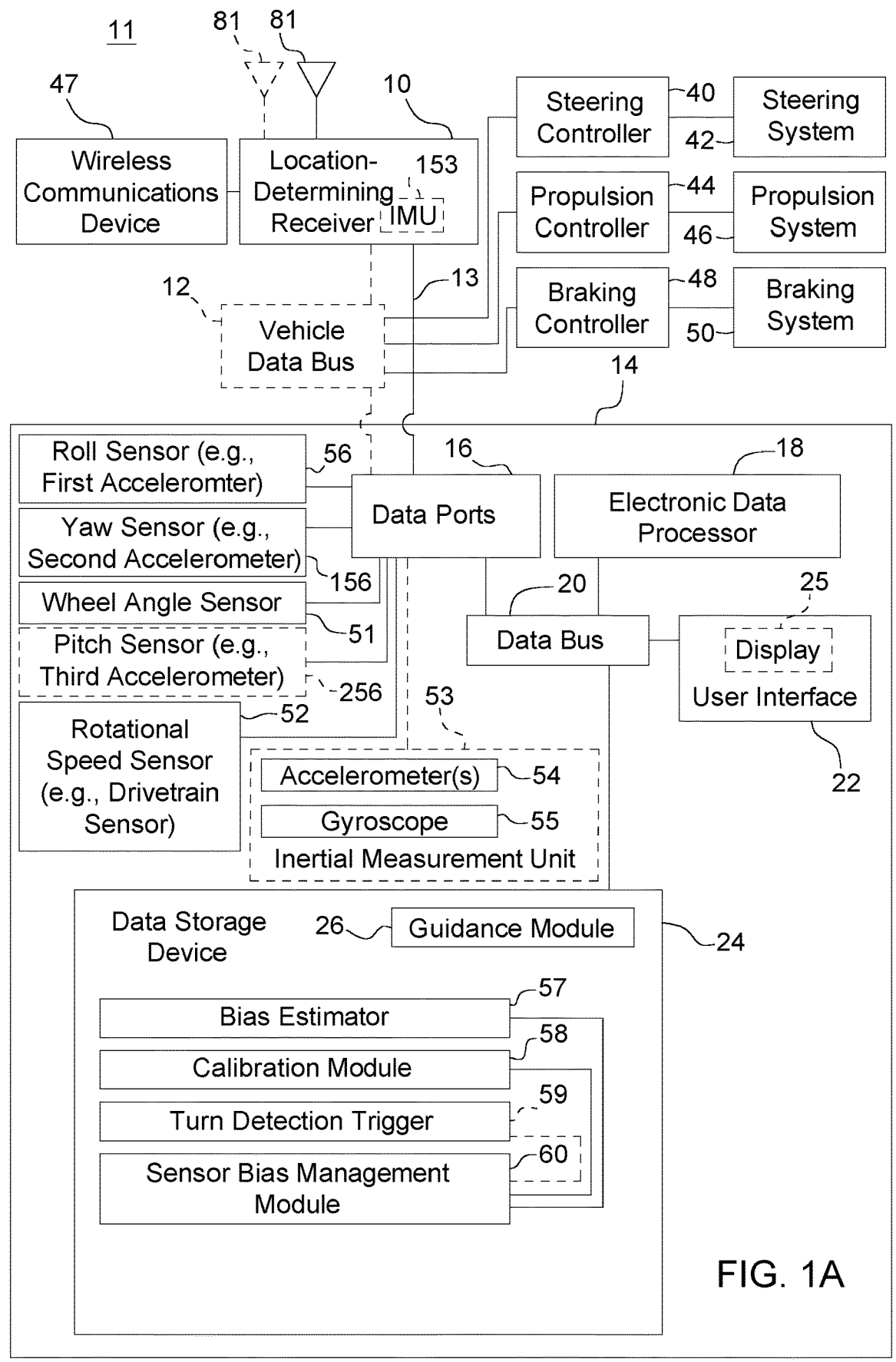
FIG. 1A is one embodiment of a block diagram of a system for detection of roll sensor bias and compensation for roll sensor bias.

FIG. 1A is one embodiment of a block diagram of a detection system 11 for detection of sensor bias and compensation for sensor bias, such as roll sensor bias. In FIG. 1A, the detection system 11 is capable of detecting and compensating for sensor bias of one or more sensors, such as accelerometers, gyroscopes, or inertial measurement units (IMU) that use accelerometers (54) or gyroscopes (55). In one example, the detection system 11 may send an alert or data message to an operator or end user of the detection system 11 via a user interface 22 that is incorporated into a vehicle, such as a display 25. In an alternate embodiment, the user interface 22 and display 25 may be located remotely from the vehicle via a wireless link to support remote control or tele-operation of the vehicle by the operator.

In one embodiment, a roll sensor 56 is configured to detect a first roll measurement (e.g., first roll angle) at or about a corresponding first point (e.g., two or three dimensional geographic coordinates) of a path plan of a vehicle, or its implement, based on one estimated current position. A yaw sensor 156, a location-determining receiver (10, 110), or a wheel angle sensor 51 is configured to detect a change in yaw measurement(s) indicative of a turn (e.g., a material turn or sufficient turn) to trigger the detection of a second roll measurement by the roll sensor 56. A material turn means sufficient angular heading change of the vehicle, or its implement, such as a yaw angular change of approximately one-hundred and eighty (180) degrees with a tolerance of plus or minus ten (10) percent. For example, yaw measurement(s) may comprise one or more yaw angles, a yaw angular velocity, or a yaw angular acceleration.

In one configuration, the roll sensor 56 measures second roll data at, or about, a corresponding second point of a path plan of a vehicle, or its implement, based on the estimated current position if the estimated yaw change is greater than a target yaw angular displacement. That is, if triggered by the electronic data processor 18 or the yaw measurement indicative of a turn (e.g., a material turn or sufficient turn), the roll sensor 56 is configured to detect a second roll measurement (e.g., second roll angle) at or about a corresponding second point (e.g., two or three dimensional geographic coordinates) of a path plan of a vehicle, or its implement, based on another estimated current position.

The first roll measurement may comprise a first roll angle, a first roll angular velocity, or a first roll angular acceleration firstly observed by the roll sensor 56 in association with the corresponding first point, which may be associated with an entrance point or entrance region of the material turn along a vehicular path or implement path; the second roll measurement may comprise a corresponding second roll angle, second roll angular velocity, or second roll angular acceleration secondly observed by the same roll sensor 56 in association with the second point, which may be associated with an exit point or exit region of the same material turn along a vehicular path or implement path.

Further, an electronic data processor 18 or bias estimator 57 (e.g., roll angle bias estimator) is configured to determine a roll measurement delta (e.g., roll angle delta) or difference (e.g., angular difference) between the first roll measurement (e.g., first roll angle) and the second roll measurement (e.g., second roll angle). If the roll measurement delta (e.g., roll angle delta) is greater than a reference roll value, the roll angle delta is evaluated over an evaluation period. For example, if the roll measurement delta (e.g., roll angle) is greater than the reference roll value for equal to or greater than a target percentage or target ratio for the evaluation period, the data processor 18, the bias estimator 57, and/or the calibration module 58 (e.g., roll-angle calibration module) is configured to designate the roll angle sensor for possible recalibration.

In one embodiment, the detection system 11 comprises an electronic data processing system 14 that is coupled to a location-determining receiver 10 directly, or via a vehicle data bus 12. The optional connection via vehicle data bus 12 is shown in dashed lines because it is optional and the connection between the electronic data processing system 14 and location-determining receiver 10 may be direct, as indicated by transmission line 13, which can be used separately or cumulatively with the interconnection via the vehicle data bus 12.

In one embodiment, the electronic data processing system 14 comprises an electronic data processor 18, one or more data ports 16, a user interface 22 and a data storage device 24 coupled to a data bus 20. The electronic data processor 18 may comprise a processor, a microcontroller, a digital signal processor, an application specific integrated circuit (ASIC), a programmable logic array, a programmable logic device, a logic circuit, an arithmetic logic unit, a Boolean logic device, or another data processing device. The data storage device 24 may comprise one or more of the following: electronic memory, nonvolatile electronic memory, an optical data storage device, a magnetic data storage device, or other device for storing digital or analog data.

In one embodiment, the data storage device 24 may store, retrieve, read and write one or more of the following items: a guidance module 26, a bias estimator 57 (e.g., roll angle bias estimator), a calibration module 58 (e.g., roll-angle calibration module), a turn-detection trigger 59, and a sensor-bias management module 60. A module means software, electronics, or both, where software may comprise software instructions, executable files, data files, libraries or other data structures, any of which may be stored in the data storage device 24, or stored in a computer server, or stored in an Internet cloud data storage, where the computer server or Internet cloud data storage are accessible, via a wireless communications network, by wireless communications device (e.g., wireless transceiver or cellular phone transceiver) coupled to the data ports 16.

As used in this document, configured to, adapted to and arranged to may refer any of the following items: (1) software or program instructions that are stored in the data storage device 24 or other data storage and executable by the data processor 18 to perform certain functions, software, (2) software or embedded firmware that are stored in the location-determining receiver 10 or its memory or data storage to perform certain functions, or (3) electronic, electrical circuits or modules that can perform substantially equivalent functions to the software, embedded firmware or program instructions.

The data port 16 may comprise a data transceiver, buffer memory, or both. The user interface 22 may comprise one or more of the following: a display (e.g., display 25), a touch screen display, a keypad, a keyboard, a control panel, a pointing device (e.g., electronic mouse), or another device for entry or output of data from the data processing system 14.

In one embodiment, a roll sensor 56 (e.g., first accelerometer), a yaw sensor 156 (e.g., second accelerometer), and optional pitch sensor 256 (e.g., third accelerometer) are coupled to the data ports 16 for communication with the data bus 20, electronic data processor 18 and the data storage device 24, among other modules, estimators or software components. The optional pitch sensor 256 is shown in dashed lines because it is optional. The roll sensor 56 (e.g., first accelerometer), a yaw sensor 156 (e.g., second accelerometer), and optional pitch sensor 256 (e.g., third accelerometer) may be mounted on the vehicle, its implement, or row units of the implement. Typically, the roll sensor 56, yaw sensor 156 and optional pitch sensor 256 may be aligned with different axes (e.g., orthogonal axes) that are suitable for respective measurements of roll measurement data, yaw measurement data and pitch measurement data.

In an alternate embodiment, multiple roll sensors, yaw sensors and pitch sensors can be mounted on both the vehicle and the implement, or on multiple row units of the implement, where the sensor measurements can be averaged or processed in other ways.

In one embodiment, the roll sensor 56 may comprise any of the following sensors: one or more accelerometers, one or more gyroscopes, or one or more inertial measurement units, where any of the above sensors are susceptible to sensor drift, sensor error, or sensor bias that may tend to increase over time in the absence of proper calibration. The roll sensor 56 may can provide roll measurements, such as roll angle, roll angular velocity and roll angular acceleration. If the roll sensor 56 provides the roll measurements in analog form, an analog-to-digital converter may be coupled to the analog output for compatibility with communications of digital data messages to the data port 16.

In one embodiment, the yaw sensor 156 may comprise any of the following sensors: one or more accelerometers, one or more gyroscopes, or one or more inertial measurement units. Further, the yaw sensor 156 may be replaced by, or supplemented by, yaw or heading measurements provided by the wheel angle sensor 51 and/or one or more location-determining receivers (10, 110). The yaw sensor 156 can provide yaw measurements, such as yaw angle, yaw angular velocity and yaw angular acceleration. If the yaw sensor 156 provides the yaw measurements in analog form, an analog-to-digital converter may be coupled to the analog output for compatibility with communications of digital data messages to the data port 16.

In one embodiment, the optional pitch sensor 256 may comprise any of the following sensors: one or more accelerometers, one or more gyroscopes, or one or more inertial measurement units, where any of the above sensors are susceptible to sensor drift, sensor error, or sensor bias that may tend to increase over time in the absence of proper calibration. The optional pitch sensor 256 can provide pitch measurements, such as pitch angle, pitch angular velocity and pitch angular acceleration. If the pitch sensor 256 provides the pitch measurements in analog form, an analog-to-digital converter may be coupled to the analog output for compatibility with communications of digital data messages to the data port 16.

Further, the data processing system 14 may comprise additional sensors, such as a wheel angle sensor 51, one or more accelerometers 54, a gyroscope 55, a rotational speed sensor 52 (e.g., drivetrain sensor), an optional inertial measurement unit (IMU) 53 coupled to the data ports 16 for communication with or over the data bus 20. In one configuration, a wheel angle sensor 51 may provide yaw data, heading data, yaw angular velocity data, or yaw angular acceleration data for the vehicle, or its implement; the rotational speed sensor 52 is configured to measure a drivetrain-derived wheel speed. The electronic data processing system 14 communicates to data ports 16 directly, or indirectly via the data bus 20.

The data ports 16 support the communication of data messages to, from or between, or among any of the following: the electronic data processor 18, the data storage device 24, any modules or software within the data storage device 24, a roll sensor 56 (e.g., first accelerometer), a yaw sensor 156 (e.g., second accelerometer), and optional pitch sensor 256 (e.g., third accelerometer), the location-determining receiver 10, the wheel angle sensor 51, one or more accelerometers 54, a rotational speed sensor, an optional IMU 53 and a data bus 20.

In one embodiment, the optional IMU 53 is a separate device, whereas in other embodiments, the IMU 153 is integral with the location-determining receiver 10. The optional separate IMU 53 comprises one or more accelerometers 54 and a gyroscope 55, where the accelerometers 54 may be arranged on orthogonal axes with respect to each other to facilitate detection of vehicle attitude, such as roll angle, pitch angle and yaw angle of a vehicle.

In FIG. 1A, the steering controller 40, the propulsion controller 44 and the braking controller 48 are coupled to the vehicle data bus 12. For example, the data processing system 14 can communicate with the steering controller 40, the propulsion controller 44 and the braking controller 48, and vice versa. In one embodiment, the steering controller 40 is coupled to the steering system 42, such as an electrical motor or electrohydraulic device that is mechanically coupled to a steering mechanism (e.g., rack-and-pinion or Ackerman steering system) for controlling the angular orientation of one or more wheels about a generally vertical axis. In one embodiment, the propulsion controller 44 may comprise an electronic engine controller for controlling a throttle or fuel metering system of a propulsion system 46, such as internal combustion engine. In another embodiment, a propulsion controller 44 may comprise an inverter or motor controller for controlling a propulsion system 46, such as a drive motor of a hybrid or electric vehicle. In one embodiment, the braking controller 48 interfaces with a braking system 50, such as hydraulic braking system, an electrohydraulic braking system, a cable braking system, or an electromechanical braking system to stop or decelerate the vehicle.

In one configuration, the guidance module 26 controls the vehicle to track or follow linear path plan, a curved path plan, an end turn, a key-hole end turn, a loop end turn, a row-skipping end turn, a contour path plan, a spiral path plan or other path plan. In the automated guidance mode, in certain vehicle configurations the guidance module 26 can control the steering, propulsion, and braking of the vehicle. For example, in the automated guidance mode, the guidance module 26 can communicate with one or more of the following controllers to direct and guide the vehicle: steering controller 40, propulsion controller 44 and braking controller 48.

In FIG. 1A in accordance with one embodiment, a sensor-bias detection system 11 for detecting roll sensor bias of a roll sensor (e.g., 56) of a vehicle (e.g., off-road vehicle) or its implement comprises a location-determining receiver 10 for estimating a position, motion, and attitude data of the vehicle, or its implement. As used in the disclosure, attitude refers to roll angle, pitch angle and yaw angle, or motion data associated with roll angle, pitch angle and yaw angle. As used in the disclosure, motion data comprises velocity data, acceleration data, or both. As used in the disclosure, a yaw angle or heading can refer to: (1) an angular direction of travel of the vehicle with reference to due North or magnetic North, or (2) a yaw or yaw angle of the vehicle with reference to coordinate system, such as a Cartesian coordinate system.

Figure 1B:
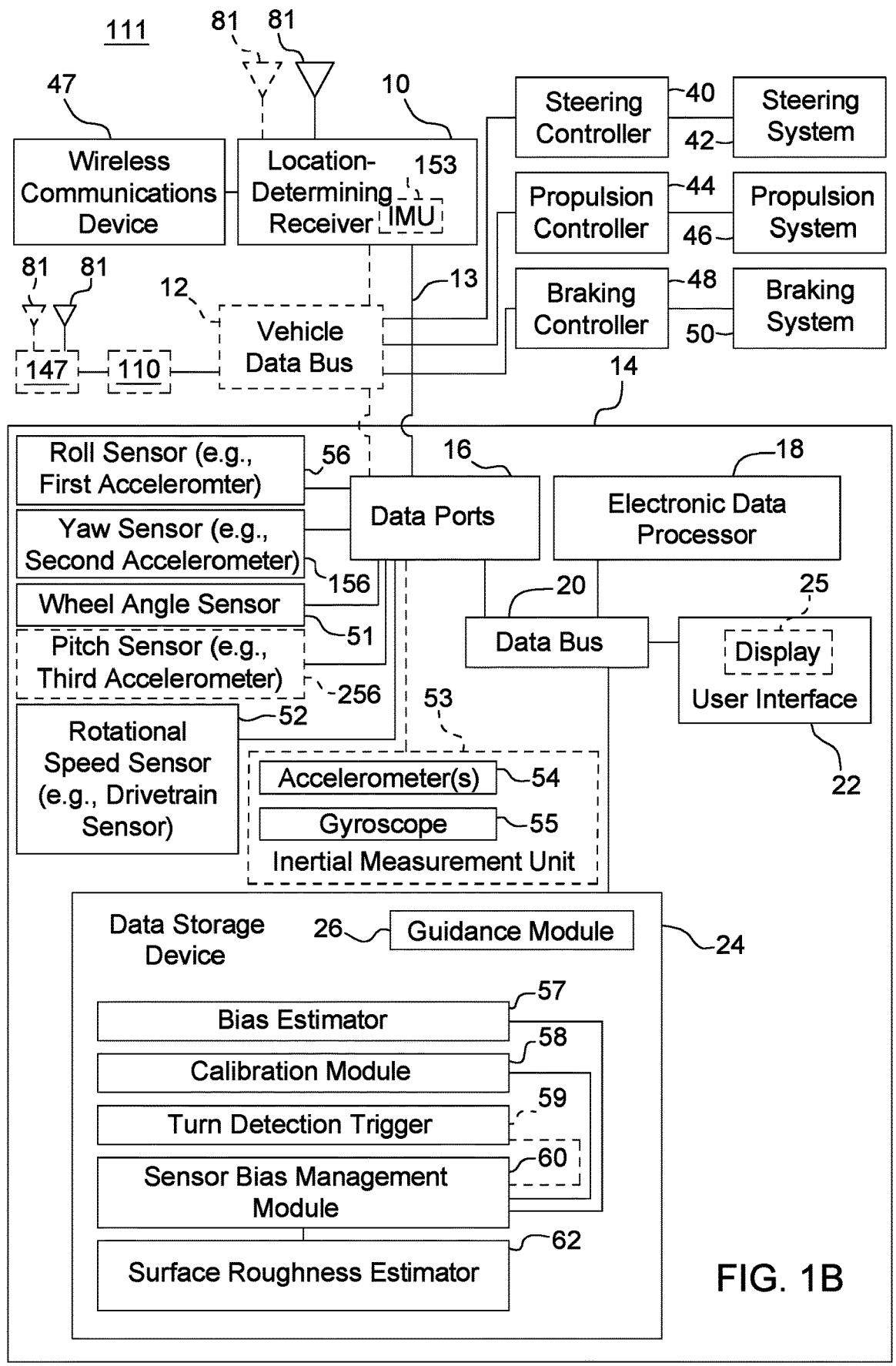
FIG. 1B is another embodiment of a block diagram of a system for detection of roll sensor bias and compensation for roll sensor bias.

FIG. 1B is another embodiment of a block diagram of a system 111 for detection of roll sensor bias and compensation for roll sensor bias. The system 111 of FIG. 1B is similar to the system 11 of FIG. 1A, except the system 111 of FIG. 1B further comprises: an optional surface roughness estimator 62, optional wireless communication device 147, and an optional location-determining receiver 110, which is the same or similar to the location-determining receiver 10. The surface roughness estimator 62, the wireless communications device 147 and the location-determining receiver 110 are shown in dashed lines to indicate that each is optional. Like reference numbers in FIG. 1A and FIG. 1B indicate like features or elements.

In FIG. 1B in one embodiment, a surface roughness estimator 62 comprises a module of software that is stored in the data storage device 24. Applicable software instructions (if any) associated with the surface roughness estimator 62 may be executed by the data processor 18. The surface roughness estimator 62 is adapted to estimate a surface roughness of the ground (e.g., a point, line segment, cell or bounded region of the ground) as a variance or standard deviation of the roll of roll angle change with respect to time based on the measured roll angle. For example, surface roughness estimator 62 may estimate a surface roughness, of a respective point, line segment, cell or bounded region of the ground, as a defined percentage (e.g., approximately eighty (80) to ninety-five (95) percent) of the roll angle rate, such as the roll angular velocity or the roll angular acceleration. In other configurations, the surface roughness estimator 62 may use roll measurements and pitch measurements from the roll sensor 56 and pitch sensor 256, respectively.

In accordance with FIG. 1B, a first location-determining receiver 10 (or its antenna 81) is mounted on the vehicle (e.g., 301 in FIG. 3) for estimating a position, motion or attitude data of the vehicle and a second location-determining receiver 110 (in FIG. 1B) (or its antenna 81) mounted on the implement for estimating a position, motion or attitude data of the implement that is coupled to the vehicle. The second location-determining receiver 110 is coupled to the wireless communications device 147.

In one embodiment, the location-determining receiver (10, 110) (e.g., satellite navigation receiver), alone or together with a wireless communications device 47, has a pair of antennas 81 that are spaced apart with a known orientation on the vehicle, or its implement. Further, the location-determining receiver (10, 110) or the electronic data processor 18 can couple (e.g., selectively or switchably in rapid succession during the same epoch) either antenna of the pair of antennas 81 to support estimation of the attitude of the pair of antennas 81 when the vehicle or implement is at a fixed position or substantially the same position. For example, the pair of antennas 81 are spaced apart by a known distance on an axis with a known or fixed orientation (e.g., compound angular offset in one or more dimensions) to the longitudinal axis (in the direction of travel of the vehicle) and vertical axis of the vehicle. The location-determining receiver (10, 110) may estimate a first position (e.g., in three dimensions) of the first antenna 81 and a second position (e.g., in three dimensions) of the second antenna 81. Accordingly, the data processor 18 or the location-determining receiver 10 may estimate the attitude (e.g., yaw data, roll data, or both) of the vehicle, or its implement, based on the first position and the second position for the same epoch or measurement period, with or without augmentation by the correction data.

In one embodiment, a wireless correction communications device 47 is coupled to a data port of a location-determining receiver 10 or a vehicle data bus 12 to augment the received satellite signals and associated carrier phase measurements of the received satellite signals (e.g., of at least four satellites) at the location-determining receiver 10. For example, the wireless communications device (47, 147) may comprise a separate receiver or transceiver (e.g., satellite, cellular, or wireless device) may receive the correction data or differential correction data via a wireless signal transmitted from a satellite or a terrestrial base station (e.g., real-time kinematic (RTK) base station). The wireless communications device (47, 147) may receive correction data from one or more of the following sources of correction data: (a) differential correction data from local base stations or local reference receivers operating in a real-time-kinematic (RTK) mode, (b) correction data associated with a precise-point-position (PPP) satellite navigation system with precise orbital correction data for satellites and satellite clocks in a PPP mode, (c) correction data applicable to a satellite navigation system, and correction data (e.g., carrier-phase offset or position vector offset) provided from a hub or central processing center in communication a network of reference satellite navigation receivers, and (d) other correction data is commercially available from local, wide-area, regional, or global correction or satellite data augmentation services.

In one embodiment, the location-determining receiver (10, 110) provides one or more of the following types of data for a vehicle: yaw data (e.g., heading data), roll data, pitch data, position data, and velocity data (e.g., in two or three dimensional coordinates). The location-determining receiver (10, 110) may comprise a satellite navigation receiver, a Global Navigation Satellite System (GNSS) receiver, a Global Positioning System (GPS) receiver, or another receiver for determining position data, motion data or attitude data. In one embodiment, a location-determining receiver (10, 110) provides location data, path heading data, vehicle heading data, yaw data, yaw angles, yaw angular velocity, yaw angular acceleration, or velocity data along target path or path plan to the data processing system 14 or guidance module 26.

In one embodiment, an optional separate inertial measurement unit 53 (IMU) may be separate from the location-determining receiver (10, 110) or an optional integral IMU 153 may be integrated with the location determining receiver (10, 110). The optional nature of the separate IMU 53 and the integral IMU 153 is indicated by dashed lines in FIG. 1A. The separate IMU 53 or the integral IMU 153 can estimate the attitude, yaw, yaw rate, roll or roll rate, for the vehicle, or its implement, for instance.

In one embodiment, the data processing system 14 comprises a roll sensor 56 and a yaw sensor 156. For example, roll sensor 56 may comprise an accelerometer, a three-axis accelerometer, a gyroscope, an IMU, or another sensor. In general, each sensor, such as roll sensor 56, that is based on accelerometer measurements and/or gyroscope measurements is subject to or susceptible to bias in their measurements that may arise over time, unless the sensor is calibrated or recalibrated.

In one embodiment, the roll sensor 56 comprises the accelerometer that is configured to measure roll angle of the vehicle. In one configuration, the roll sensor 56 may provide a roll sensor measurement or roll sensor motion data that the electronic data processor 18 can use to determine a surface roughness estimate.

In another embodiment, the accelerometers 54, gyroscopes 55 or IMU (53, 153) of the data processing system 14 detect or measure one or more of the following: pitch angle, pitch motion data, roll angle and roll motion data for a cell or zone of the field or work area based on the detected motion data, pitch data and roll data for the sampling interval.

Accordingly, to determine a reliable or accurate estimate of the surface roughness or a surface roughness index (for a respective point, linear segment, cell or region), the electronic data processor 18 or bias estimator 57 can detect the sensor bias (of the roll sensor 56) and the calibration module 58 (or sensor-bias management module 60) can perform calibration of roll sensor data, pitch sensor data, or both. Although the illustrative example of FIG. 2 pertains primarily to detection of bias and compensation for bias in the context of roll sensor data, the optional pitch sensor 56 may be calibrated or recalibrated (e.g., simultaneously or afterwards with the roll angle calibration of the method of FIG. 2) by applying to new observations (e.g.., next pitch measurement samples) the difference between: (a) reference pitch data from one or more location-determining receivers (10, 110) equipped with pairs of antennas 81 and in receipt of precise correction data, and (b) observed pitch data observed from the optional pitch sensor 256 for the same evaluation period or sampling interval. The reference pitch data and observed pitch data may both comprise pitch angle data, pitch angular velocity data, and/or pitch angular acceleration data, for example.

Figure 2:
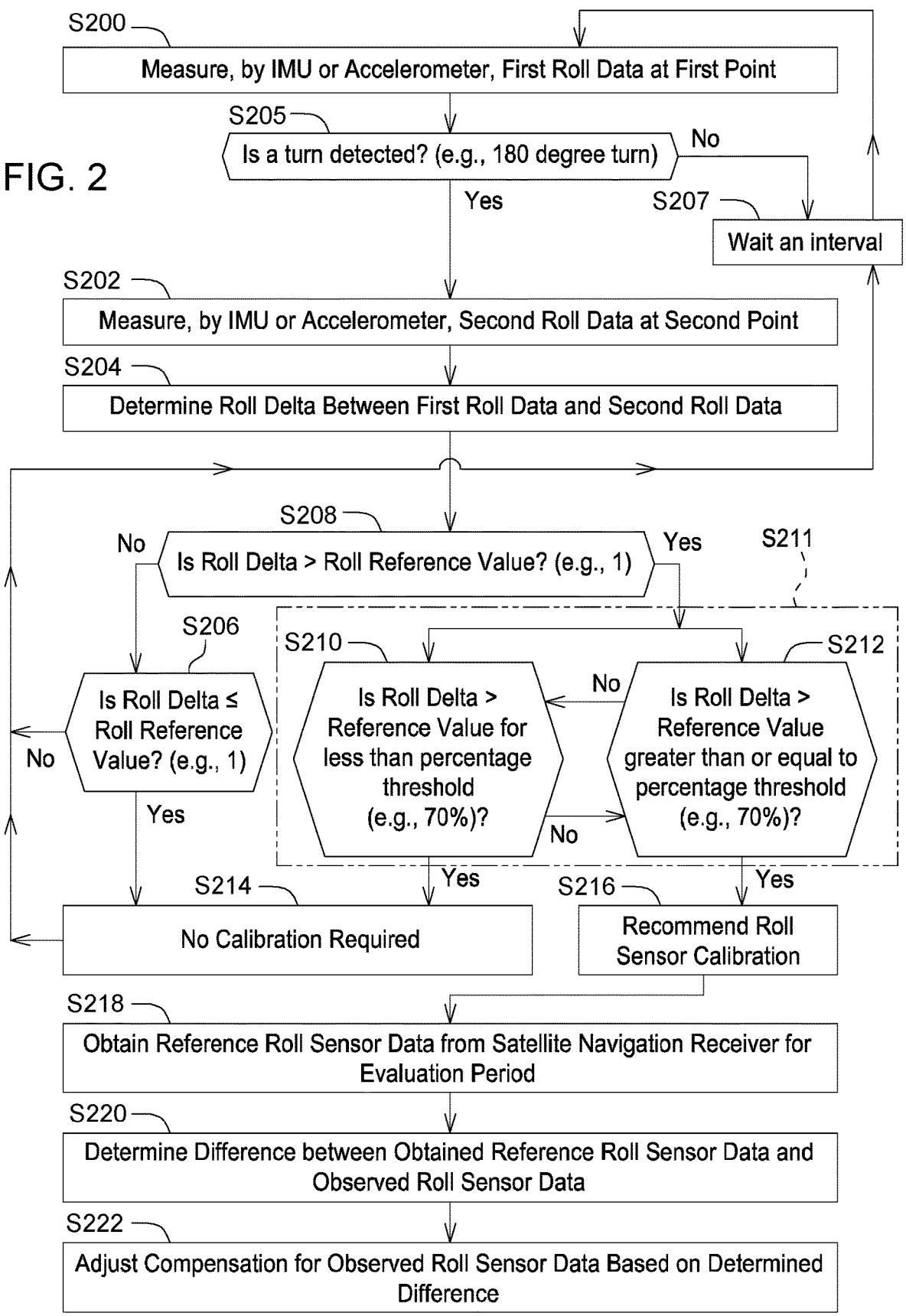
FIG. 2 is one embodiment of a flow chart of method for detection of roll sensor bias and compensation for roll sensor bias.

In an alternate embodiment, along with the independently triggered/timed calibration of the roll sensor 56 in accordance with the method of FIG. 2, the optional pitch sensor 56 may be calibrated or recalibrated (e.g., regularly or periodically upon expiration of a timer) by applying to new observations (e.g., next pitch measurement samples) the difference between: (a) reference pitch data from one or more location-determining receivers (10, 110) equipped with pairs of antennas 81 and in receipt of precise correction data, and (b) observed pitch data observed from the optional pitch sensor 256 for the same evaluation period or sampling interval.

FIG. 2 is one embodiment of a flow chart of a method for detection of roll sensor bias and compensation for roll sensor bias. The method of FIG. 2 begins in step S200.

In step S200, a roll sensor 56 detects or measures first roll data (e.g., first roll angular acceleration data) at a first point, such as at or near a starting point of a turn of known yaw angular displacement. The first roll data comprises first roll angular acceleration data or any of the following first roll data: (a) first roll angular acceleration data, (b) first roll angular velocity data, and (c) first roll angle data. The first point may be referred to synonymously as the turn entrance point.

In one embodiment, the first roll data may be as few as a single measurement of roll angle data or first roll data for one sampling interval that is coincident with the observed position of the vehicle in alignment with the first point. Typically, the first roll data may comprise multiple samples or measurements of roll angle data or first roll data for one or more sampling intervals. Further, the electronic data processor 18 may determine an average, mean, median or mode of sampled first roll data (e.g., observed roll angles) within one or more sampling intervals.

The first roll data may be limited based on one or more sampling intervals or limited within a positional range or positional tolerance (e.g., radius) of the first point, or within positional range of a recorded vehicle path, or recorded implement path, (e.g., substantially linear segment or curved segment that intercepts the first point) during which the roll sensor 56 collects a series of roll data measurements associated with corresponding positions (e.g., in two or three dimensions). The vehicle, or its implement, may be equipped with a location-determining receiver (10, 110) (e.g., satellite navigation receiver) that determines one or more observed, estimated positions of the vehicle, or its implement, such that the electronic data processor 18 can estimate or determine when the observed position of the vehicle, or its implement, is in alignment with the first point to trigger collection of the roll sensor datum or roll sensor data over one or more sampling intervals within the positional range or positional tolerance of the first point, or within positional range of a recorded vehicle path, or recorded implement path, (e.g., substantially linear segment or curved segment that intercepts the first point) during which the roll sensor 56 collects a series of roll data measurements associated with corresponding positions (e.g., in two or three dimensions).

In step S205, an electronic data processor 18 or a turn-detection trigger 59 is configured to detect a material turn or a target range of yaw change that is indicative of a material turn (e.g., 180 degree turn). If the electronic data processor 18 or turn-detection trigger 59 detects a material turn, or a target range of yaw change that is indicative of a material turn, the method continues with step S202. However, if the electronic data processor 18 or turn-detection trigger 59 does not detect the material turn, or a target range of yaw change that is indicative of a material turn, the method continues with step S207.

Step S205 may be executed in accordance with various examples, which may be applied separately or cumulatively. Under a first example, a material turn or sufficient turn can be indicated by a target range of yaw angular displacement (of a yaw sensor 156, wheel angle sensor 51 or location-determining receiver 10) that accompanies an end-loop or yaw-reversal turn of the vehicle, such as an end loop turn of approximately one-hundred and eighty (180) degrees of the vehicle, its implement or both, for instance. As set forth in this disclosure, approximately shall mean plus or minus ten percent of any angle or yaw angle, for instance, unless the end user opts for more precise definition of the yaw angular displacement to qualify as a material turn.

Under a second example, the material turn means a sufficient angular heading change of the vehicle, or its implement, that is indicated by an observed yaw angular velocity or an observed yaw angular acceleration (of a yaw sensor 156, wheel angle sensor 51 or location-determining receiver 10) associated with one or more sampling intervals that are temporally coincident with the vehicle's execution of a material turn. For example, the sufficient angular heading change is recognized if the observed yaw angular velocity is consistent with a reference yaw angular velocity (e.g., reference plot of yaw angle versus time), or if the observed yaw angular acceleration is consistent with a reference yaw angular acceleration (e.g., reference plot of yaw angle versus time squared) that is associated with an angular heading change of approximately one hundred and eighty (180) degrees. For example, yaw measurement(s) may comprise one or more yaw angles, a yaw angular velocity, or a yaw angular acceleration.

In step S205, a yaw sensor 156 detects a material turn of the corresponding target range of yaw angular displacement, such as an approximately one-hundred and eighty degree turn. The material turn can have one or more of the following shapes: an approximately one-hundred and eighty degree (180) loop turn, an approximately one-hundred and eighty degree (180) key-hole shaped turn, an approximately one-hundred and eighty degree (180) adjoining row turn, and/or an approximately one-hundred and eighty-degree (180) row-skipping turn.

If the electronic data processor 18 or turn-detection trigger 59 does not detect the material turn, or a target range of yaw change that is indicative of a material turn, the method continues with step S207. In step S207, the electronic data processor 18 waits for a time interval or one or more sampling intervals and then returns to step S200. However, if the electronic data processor 18 or turn-detection trigger 59 detects a material turn, or a target range of yaw change that is indicative of a material turn, the method continues with step S202.

In step S202, the roll sensor 56 detects or measures second roll data at a second point, such as at or near an end point of the turn of the threshold yaw angular displacement. Step S202 may be executed in accordance with various techniques, which may be applied alternately or cumulatively.

Under a first technique for step S202, the roll sensor 56 detects or measures second roll data at a second point, or in a targeted data collection region about the second point, if the electronic data processor 18 or turn-detection trigger 59 detected the turn a yaw change that is indicative of a material turn in step S205.

Under a second technique, if triggered by the electronic data processor 18 or the turn-detection trigger 59, a roll sensor 56 is instructed, commanded, or configured to detect second roll data or a second roll measurement (e.g., second roll angle) at a corresponding second point or in a targeted data collection region about the second point, where the second point intercepts or is projected to intercept a path plan of a vehicle, or its implement, based on another estimated current position.

Under third technique for step S202, the electronic data processor 18 or the turn-detection trigger 59 may immediately trigger the recording of roll sensor data from the roll sensor 56 along with the tracking of corresponding estimated position of the vehicle, or the implement, by the location-determining receiver (10, 110) during one or more sampling intervals. For example, prior to imminently reaching the second point, the electronic data processor 18 or the turn-detection trigger 59 may immediately trigger the recording of roll sensor data from the roll sensor 56 along with the tracking of corresponding estimated position of the vehicle, or the implement, during one or more sampling intervals, until the second point is reached or surpassed by a margin. Accordingly, in the data storage device 24 the electronic data processor 18 can store the collected second roll data of the roll sensor 56 temporally coincident with corresponding estimated positions (e.g., in two or three dimensions) of the location-determining receiver (10, 110), where the collected second roll data tracks a path plan of the vehicle, or its implement, such as a generally linear segment, curved segment or both.

In one embodiment, the second roll data may be as few as a single measurement of roll angle data or second roll data for one sampling interval that is coincident with the observed position of the vehicle in alignment with the second point. Typically, the second roll data may comprise multiple samples or measurements of roll angle data or second roll data for one or more sampling intervals. Further, the electronic data processor 18 may determine an average, mean, median or mode of sampled second roll data (e.g., observed roll angles) within one or more sampling intervals.

The second roll data may be limited based on one or more sampling intervals or limited within a positional range or positional tolerance (e.g., radius) of the second point, or within positional range of a recorded vehicle path, or recorded implement path, (e.g., substantially linear segment or curved segment that intercepts the first point) during which the roll sensor 56 collects a series of roll data measurements associated with corresponding positions (e.g., in two or three dimensions). The vehicle, or its implement, may be equipped with a location-determining receiver (10, 110) (e.g., satellite navigation receiver) that determines one or more observed, estimated positions of the vehicle, or its implement, such that the electronic data processor 18 can estimate or determine when the observed position of the vehicle, or its implement, is in alignment with the second point to trigger collection of the roll sensor datum or roll sensor data over one or more sampling intervals within the positional range or positional tolerance of the second point, or within positional range of a recorded vehicle path, or recorded implement path, (e.g., substantially linear segment or curved segment that intercepts the second point) during which the roll sensor 56 collects a series of roll data measurements associated with corresponding positions (e.g., in two or three dimensions).

In step S204, the electronic data processor 18 or bias estimator 57 (e.g., roll angle bias estimator) determines a difference or roll delta between the measured first roll data and measured second roll data. The electronic data processor 18 may determines a difference or roll delta between the measured first roll data of step S200 and measured second roll data of step S204. For example, the electronic data processor 18 determines the roll delta by subtracting the first roll data from the second roll data and taking the absolute value of the difference. Step S204 may be executed in accordance with various examples that may be applied separately or cumulatively.

Under a first example of carrying out step S204, a difference between the first roll data and the second roll data comprises a difference between first acceleration roll data and second acceleration roll data, where the first acceleration roll data is associated with the first point and the second acceleration roll data is associated with the second point. Under a second example, a difference between the first roll data and the second roll data comprises a difference between first velocity roll data and second velocity roll data, where the first velocity roll data is associated with the first point and the second velocity roll data is associated with the second point. Under a third example, a difference between the first roll data and the second roll data comprises a difference between first roll angle data and second roll angle data, where the first roll angle data is associated with the first point and the second roll angle data is associated with the second point.

Under a fourth example of carrying out step S204, for a valid comparison or determination of the difference of roll data observations or roll data measurements at the first point and the second point, the difference of the roll data observations or roll data measurements must be equal to less than a maximum threshold, such as a one degree or another desired degree of precision (e.g., target precision metric). In one configuration, the desired degree of precision indicates that the terrain is generally planar or not laterally sloped between the first point and the second point between the end turn in a manner that would distort the roll data observations or differences between roll data observations for motion data, such as observed differences in roll data acceleration between the first point and the second point.

Under a fifth example of carrying out step S204, the roll delta, relative change or difference in the roll data is determined in accordance with the following equation:

$\Delta_{Roll}=|D_1-D_2|$, where $\Delta_{Roll}$ is the roll delta or roll difference, $D_1$ is the first roll data (e.g., first roll angular acceleration data) at, or about, the corresponding first point (e.g., entrance point to a turn), and $D_2$ is the second roll data (e.g., second roll angular acceleration) at, or about, the corresponding second point (e.g., exit point to a turn). Further, there may be a condition that requires the observed roll angles, such as the first roll angle and the second roll angle, at, or about, the first point and the second point, respectively, to be substantially equal, within a tolerance or maximum threshold, which indicates that the terrain is not materially laterally sloped in a manner that would affect the observations or accuracy of the first roll data and second roll data. For the above equation, the below equation, and throughout the disclosure, the first roll data and second roll data may comprise any of the following: roll angle data, roll angular velocity data, and roll angular acceleration data, first roll angle data paired with second roll data, first roll angular velocity data paired with second roll angular velocity data, and first roll angular acceleration data paired with second roll angular acceleration data.

Under a sixth example, the roll delta or relative change in the roll data is determined in accordance with the following equation:

$$\Delta_{Roll} = \frac{|D_1 - D_2|}{D_{Ref}},$$

where $\Delta_{Roll}$ is the roll delta or difference, $D_1$ is the first roll data, $D_2$ is the second roll data, and $D_{Ref}$ is the roll reference value.

In accordance with S204, various techniques may be applied separately or cumulatively to estimate or provide the roll reference value ($D_{Ref}$), such as a parameter or constant. Under a first technique, the roll reference value is associated with the yaw angular displacement of the turn other than approximately 180 degrees (e.g., plus or minus a factory-defined tolerance, technician-defined tolerance or user-definable tolerance). Under a second technique, the roll reference value (e.g., roll reference value based on yaw angular displacement) may be determined through tests, empirical results, and may be stored as a look-up table, inverted file or other data structure of angular turn displacement versus yaw reference Under a third technique, the roll reference value, $D_{Ref}$, may be set to have values with a maximum range from 0.5 to 2, for example. Under a fourth technique, the roll reference value, $D_{Ref}$, may be set to have values (e.g., parameter values) with a maximum range from 0.2 to 1.5, for example. Under fifth technique, the roll reference value, $D_{Ref}$, may be set to have values that are less than one for row crop operations. Under the sixth technique, the roll reference value, $D_{Ref}$, may be set to have values that are less than one degree from the reference value of the location-determining receiver 10 (e.g., satellite navigation receiver) for row crop operations.

In the flow chart of the method of FIG. 2, step S206, step S208, or both may be executed after step S204.

In step S208, the data processor 18 or the bias estimator 57 determines if the roll delta or roll difference is greater than the roll reference value (e.g., one (1)). If the roll delta is greater than roll reference value (e.g., one (1)), the method continues with step S211, which includes step S210, step S212, or both.

In step S206, the data processor 18 or the bias estimator 57 determines if the roll delta or roll difference is less than or equal to a roll reference value (e.g., one (1)). If the roll delta is less than or equal to the roll reference value (e.g., one (1)), the method continues with step S214. However, if the roll delta is not less than or equal to the roll reference value (e.g., one (1)), the method may return to step S207.

In step S210, the data processor 18, calibration module 58, or sensor-bias management module 60 determines if the roll delta is greater than the roll reference value (e.g., one (1)) for less than a target percentage threshold or target ratio of turns (e.g., material turns) during an evaluation period. The evaluation period can be during a current operating session of the vehicle, during a recent reference operating sessions of the vehicle, or turns (e.g., material turns) executed by the vehicle within a certain recent time window (e.g., last growing season or current growing season). In one example, the target percentage threshold or target ratio is approximately seventy (70) percent, although other target percentage thresholds or equivalent ratios fall within the scope of the claims Other suitable target percentage thresholds, equivalent ratios, may range from approximately sixty percent (60) to approximately ninety percent (90), for example.

In step S210, if the data processor 18, calibration module 58, or sensor-bias management module 60 determines that the roll delta is greater than the roll reference value (e.g., one (1)) for less than the target percentage threshold, or an equivalent ratio, then the method continues with step S214. However, if the data processor 18 determines that the roll delta is greater than the roll reference value (e.g., one (1)) for not less than (e.g., or greater than) the target percentage threshold, or an equivalent ratio, then the method continues with step S212.

In step S214, the data processor 18 determines that no calibration is required for the current sampling interval or set of sampling intervals. After step S214, the method may progress through another iteration by returning to step S207, for example.

In step S212, the data processor 18, calibration module 58, or sensor-bias management module 60 determines if the roll delta or roll difference is greater than the roll reference value (e.g., one (1)) for greater than or equal to a target percentage threshold or ratio of turns (e.g., material turns) during an evaluation period. The evaluation period can be during a current operating session of the vehicle, during a recent reference operating sessions of the vehicle, or turns (e.g., material turns) executed by the vehicle within a certain recent time window (e.g., last growing season or current growing season). In one example, the target percentage threshold or target ratio is approximately seventy (70) percent, although other target percentage thresholds or equivalent ratios fall within the scope of the claims. Other suitable target percentage thresholds, equivalent ratios, may range from approximately sixty percent (60) to approximately ninety (90) percent, for example In step S212, if the data processor 18, calibration module 58, or sensor-bias management module 60 determines that the roll delta is greater than the reference roll value (e.g., one (1)) for equal to or greater than the target percentage threshold, or an equivalent ratio, then the method continues with step S216. However, if the data processor 18 determines that the roll delta is not greater than the reference roll value (e.g., one (1)) for equal to or greater than the target percentage threshold, or an equivalent ratio, then the method continues with step S214.

In one illustrative configuration, step S211, step S210 and S212 may use loop counters with logic or other mechanisms to prevent the steps S210 and S212 from entering into repeated execution of an unwanted loop for any single iteration of the flow chart of the method of FIG. 2, where the logic directs the execution of the program to step S214 or step S207 if a count of a loop counter is exceeded, for instance.

In step S216, the data processor 18, calibration module 58, or sensor-bias management module 60 may recommend or engage in roll sensor 56 calibration, unless the roll sensor 56 was recently calibrated within an recent recalibration period. If the roll sensor 56 was recently calibrated, the operator, end user, or servicing technician may be prompted on the display 25 to approve or authorize a reset of the sensor calibration process if the operator indicates that a previous recent roll sensor 56 calibration needs to be overridden, superseded or redone. If the sensor is recommended or authorized for roll sensor calibration, the method continues with step S218.

In step S218, the data processor 18 may obtain reference roll sensor 56 data from a location-determining receiver (10, 110) (e.g., satellite navigation receiver) for the evaluation period, or for one or more sampling intervals following the evaluation period in which a calibration is required or recommended per step S216. For example, the data processor 18 may obtain reference roll sensor data from the location-determining receiver (10, 110) when the vehicle, or its implement, executes a next turn of target yaw angular displacement (e.g., of approximately one-hundred and eighty degrees), unless the data processor 18 stores or saves at least the last or most recent reference roll sensor data from the location-determining receiver (10, 110) when the vehicle, or its implement, that is associated with previous execution (e.g., in steps S200 and S202) of the last turn of known yaw angular displacement (e.g., of approximately one-hundred and eighty degrees).

In one embodiment, the location-determining receiver (10, 110) (e.g., satellite navigation receiver), alone or together with a wireless communications device (47, 147), has a pair of antennas 81 that are spaced apart with a known orientation and are coupled selectively or switchably to support precise estimation of the attitude of the pair of antennas 81 when the vehicle or implement is at a fixed position or substantially the same position. As used in the disclosure, attitude refers to roll, pitch and yaw angles, or motion data associated with roll, pitch and yaw angles. The attitude estimated by the carrier-phase processing of the received satellite signals of the location-determining receiver (10, 110) is not subject to the bias or drift that the accelerometer 54, gyroscope 55, or optional IMU (53, 153) of the location-determining receiver (10, 110) are subject to.

In step S220, the data processor 18, bias estimator 57, calibration module 58, and/or sensor-bias management module 60 may determine a difference between obtained reference roll sensor data and observed roll sensor data of a roll sensor 56 or a set of roll sensors 56 (e.g., redundant roll sensors). For example, during a next turn or the last turn, data processor 18 or calibration module 58 may determine a difference between obtained reference roll sensor data and observed roll sensor data at the first point, at the second point, or both for the corresponding next turn or the last turn. The roll sensor bias correction, roll sensor calibration, or roll sensor adjustment may be defined as the difference between the reference roll sensor data (of the location-determining receiver (10, 110) equipped with two antennas 81 and in receipt of correction data for carrier-phase-derived position estimation in the precise point positioning mode, or similar wide-area differential, carrier-phase augmentation modes, or in the real-time kinematic precision mode (RTK)) and the observed roll sensor data (of the roll sensor 56) for one or more measurement points, over one or more turns. The roll sensor bias can arise from drift in the sensor over time, fluctuations in ambient temperature, or for other reasons, for example.

In step S222, the data processor 18, the calibration module 58, and the sensor-bias management module 60 may adjust the compensation for the observed roll sensor 56 data based on the determined difference or roll bias compensation value. The roll bias compensation value may remain valid for a maximum time period or until the method of FIG. 2 determines an earlier calibration of the roll sensor 56 is recommended and/or authorized.

Figure 3:
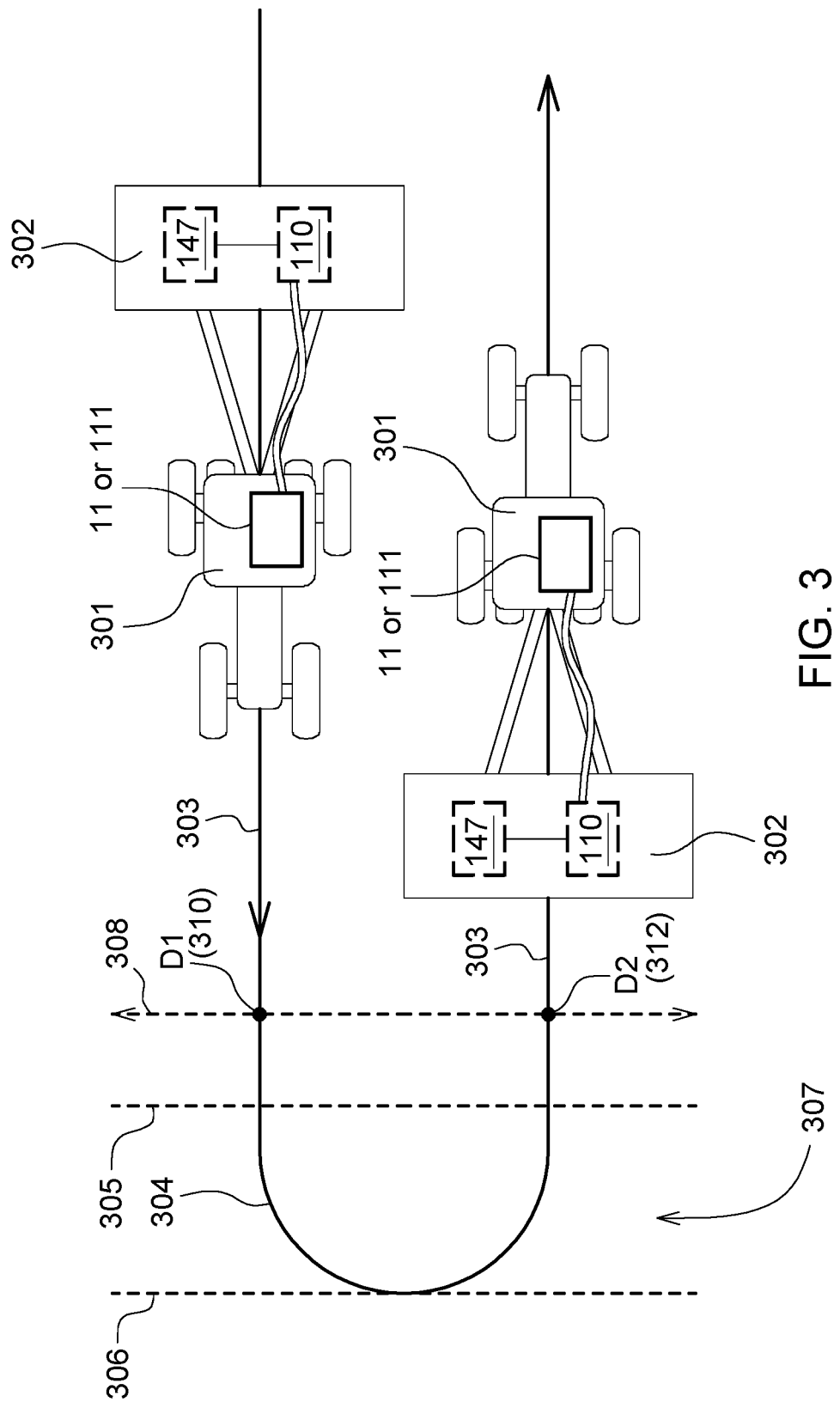
FIG. 3 is a plan view of a vehicle tracking a test path consistent with the method for detection of roll sensor bias and compensation.

FIG. 3 is a plan view of a vehicle tracking a test path consistent with the method for detection of roll sensor bias and compensation for a roll sensor 56. In FIG. 3, the vehicle 301 tows an implement 302 behind the vehicle. For example, the vehicle 301 may comprise a tractor with a propulsion system 46 that power the implement forward along a test path or along a planned path of the vehicle while performing an agricultural task or other work operation. The vehicle 301 may incorporate or comprise the system (11, 111); an optional location-determining receiver 110 and option wireless communications device 147 may be mounted on the implement 302, as illustrated in FIG. 3. The location-determining receiver 110 and the wireless communications device 147 are shown in dashed lines to indicate that they are optional features, which can be used to provide position and attitude data concerning the implement 302, rather than inferring such implement position and implement attitude data from the respective vehicle position and vehicle attitude data observed at the vehicle 301, alone or in conjunction with a kinematic model or other model of movement of the implement 302 with respect tot he vehicle 301.

As illustrated, first, the vehicle 301 travels along the test plan or planned path along a first generally linear segment 303 (e.g., here from left to right) until the vehicle or its implement approaches or reaches the first point 310 or turn entrance point ($D_1$). For example, the location-determining receiver (10, 110) may be mounted on the vehicle 301, or the implement 302, or both, to determine when the vehicle 301, or its implement 302 is aligned with or spatially coincident with, or at or about, the first point 310. When the vehicle 301, or its implement 302, is coincident with, or at or about, the first point 310 or first entrance point, the roll sensor 56 takes one or more first corresponding roll data measurement(s) and the location-determining receiver (10, 110) provides corresponding position estimates (e.g., two or three dimensional coordinates) at or about the first point 310. In the data storage device 24, the electronic data processor 18 may store a trace or recording (e.g., pairs of roll data samples and corresponding position estimates) of a vehicle path, an implement path, or both that coincides with the generally linear segment 303, or at or about the first point. The trace or recording may include recording prior to the turn or material turn executed in FIG. 3, such as prior to reaching a region (e.g., radius) at or about the first point 310.

Second, the vehicle 301, and its implement 302, complete a turn path segment 304, turn or end turn (e.g., material turn) of a target reference angular yaw displacement, such as approximately one-hundred and eighty degrees. As illustrated, all or some portion of the curved turn path segment 304 may fall outside an inner field boundary 305 or field edge. In some configurations, all or some portion of the curved turn path segment 304 may fall within an edge zone or perimeter zone 307 of the field, which can be referred to as a headland. In the data storage device 24, the electronic data processor 18 may store a trace or recording (e.g., pairs of roll data samples and corresponding position estimates) of a vehicle path, an implement path, or both that coincides with the generally curved turn path segment 304 near or during the turn (e.g., material turn) executed in FIG. 3, such as near a region (e.g., turn radius or curve) between the first point 310 and the second point 312.

Third, the vehicle 301, and its implement 302, travel along the test plan or planned path along a second generally linear segment 303 (e.g., here from right to left) until the vehicle 301, or its implement 302, reaches the second point 312 or turn exit point ($D_2$). For example, the location-determining receiver (10, 110) may be mounted on the vehicle 301, or the implement 302, or both, to determine when the vehicle or its implement is aligned with or spatially coincident with the second point 312. When the vehicle is coincident with the second point 312 or second entrance point, the roll sensor 56 takes one or more second corresponding roll data measurement(s). The vehicle 301, and its implement 302, may continue on the same generally linear heading of the generally linear segment 303 after the roll sensor 56 takes one or more second roll data measurement(s) at or about the second point 312. In the data storage device 24, the electronic data processor 18 may store a trace or recording (e.g., pairs of roll data samples and corresponding position estimates) of a vehicle path, an implement path, or both that coincides with the generally curved turn path segment 304, after to the turn or material turn executed in FIG. 3, such a region (e.g., radius) at or about the second point 312.

FIG. 3 illustrates the path of the vehicle and its implement consistent with FIG. 1A, FIG. 1B and FIG. 2, for example.

The method and system of the disclosure is well-suited to increasing or enhancing roll sensor 56 accuracy that might otherwise result in guidance error or errors in measurement in the application of precision crop inputs. The method and system can be applied to calibrate roll sensors on an as-needed or as-required basis between scheduled calibration updates that may occur sometimes upon the expiry of a timer, upon installation, or replacement or roll sensors. The system and method of the disclosure can facilitate roll bias detection to identify when the sensor has a material or significant roll bias to trigger or complete a calibration to reduce or eliminate roll bias. Advantageously, the disclosure can be configured to accurately measure the roll sensor data on multiple turns to identify a roll sensor bias that is verifiable over evaluation periods on a statistical basis to determine when a sensor calibration process is required or should be invoked.

The disclosure is well-suited for triggering automatic calibration or recalibration of roll sensor bias whenever a satellite navigation receiver (with an integral roll sensor, such as an accelerometer, gyroscope or IMU) is mounted on a vehicle or moved from another vehicle. Even if an end user or technician does not perform a manual sensor bias calibration, or even if an end user or technician incorrectly or improperly performs a manual sensor basis calibration, the automatic calibration of the sensor bias (e.g., roll sensor bias) can overwrite and supersede such prior incorrect or improperly performed calibration within a brief time period incidental to the recalibration or calibration triggering process set forth in the disclosure.

Although the disclosure primarily refers to the detection and calibration of roll sensor bias, in an alternate embodiment the system or method of the disclosure may be applied to the detection and calibration of roll sensor bias, pitch sensor bias, yaw sensor bias, or any combination of the foregoing sensor biases.

This document describes various illustrative embodiments which can be varied in many ways. Such variations are not to be regarded as a departure from the spirit and scope of illustrative embodiments, and all such variations or modifications as would be obvious to one skilled in the art are intended to be included within the scope of the claims.

The following is claimed:

1. A method for detection of roll sensor bias, the method comprising:
    estimating, by a location-determining receiver, a current position of a vehicle or its implement;
    detecting, by a roll angle sensor, a first roll angle at a corresponding first point of a path plan of the vehicle, or its implement, based on the estimated current position;
    detecting, by the roll angle sensor, a second roll angle at a corresponding second point of the path plan of the vehicle, or its implement, based on the estimated current position;
    determining, by an electronic data processor, a roll angle delta or difference between the first roll angle and the second roll angle, where the electronic data processor is configured to communicate with the roll angle sensor and the location-determining receiver;
    if the roll angle delta is greater than a reference roll value, the electronic data processor is configured to evaluate the roll angle delta over an evaluation period;
    if the roll angle delta is greater than the reference roll value for a target percentage threshold or target ratio of material turns of the vehicle during the evaluation period, the electronic data processor is configured to designate a roll angle sensor for calibration or recalibration, where each of the material turns are representative of a yaw-reversal turn of the vehicle.

2. The method for detection of roll sensor bias according to claim 1 wherein the first point comprises an turn entrance point and wherein the second point comprises a turn exit point of a row end turn.

3. The method for detection of roll sensor bias according to claim 1 wherein the reference roll value is equal to one.

4. The method for detection of roll sensor bias according to claim 1 wherein the roll reference value is within a range from 0.2 to 1.5.

5. The method for detection of roll sensor bias according to claim 1 wherein the roll reference value is less than one for a field or work area with row crops.

6. The method for detection of roll sensor bias according to claim 1 wherein the target threshold reference percentage is seventy (70) percent.

7. The method for detection of roll sensor bias according to claim 1 wherein the target threshold reference percentage is within a range of sixty percent (60) to ninety (90) percent.

8. The method for detection of a roll sensor bias according to claim 1 further comprising:
    detecting a turn of a known yaw angular displacement or reference yaw angle of approximately one-hundred and eighty degrees, indicative of the yaw-reversal turn, to trigger the detection of a second roll angle at a corresponding second point of the path plan of a vehicle, or its implement, based on the estimated current position and to trigger the evaluation of if the roll angle delta is greater than a reference roll value.

9. The method according to claim 1 further comprising:
    obtaining reference roll sensor data from a location-determining receiver for the evaluation period, when the vehicle, or its implement, executes a next turn of known yaw angular displacement;
    calibrating the roll sensor with the obtained reference roll sensor data.

10. The method according to claim 1 further comprising:
    obtaining, from a data storage device, reference roll sensor data associated with the corresponding first point and the second point that was stored as last or most recent reference roll sensor data from a location-determining receiver when the vehicle, or its implement, is associated with previous execution of the path plan of the vehicle.

11. A system for detection of roll sensor bias, the system comprising:
    a location-determining receiver configured to estimate a current position of a vehicle or its implement;
    a roll angle sensor configured to detect a first roll angle at a corresponding first point of a path plan of the vehicle, or its implement, based on the estimated current position;
    the roll angle sensor configured to detect a second roll angle at a corresponding second point of the path plan of the vehicle, or its implement, based on the estimated current position;
    an electronic data processor for determining a roll angle delta or difference between the first roll angle and the second roll angle; the electronic data processor capable of communicating with a data storage device, the location-determining receiver and the roll angle sensor via a data bus; the electronic data processor configured to execute software instructions stored in the data storage device:
    to determine if the roll angle delta is greater than a reference roll value, evaluate the roll angle delta over an evaluation period;
    to determine if the roll angle delta is greater than the reference roll value for a target percentage threshold or target ratio of material turns of the vehicle during the evaluation period, that is configured to designate the roll angle sensor for calibration or recalibration, where each of the material turns are representative of a yaw-reversal turn of the vehicle.

12. The system for detection of roll sensor bias according to claim 11 wherein the first point comprises an turn entrance point and wherein the second point comprises a turn exit point of a row end turn.

13. The system for detection of roll sensor bias according to claim 11 wherein the reference roll value is equal to one.

14. The system for detection of roll sensor bias according to claim 11 wherein the roll reference value is within a range from 0.2 to 1.5.

15. The system for detection of roll sensor bias according to claim 11 wherein the roll reference value is less than one for a field or work area with row crops.

16. The system for detection of roll sensor bias according to claim 11 wherein the target threshold reference percentage is seventy (70) percent.

17. The system for detection of roll sensor bias according to claim 11 wherein the target threshold reference percentage is within a range of sixty percent (60) to ninety (90) percent.

18. The system for detection of a roll sensor bias according to claim 11 further comprising:
a yaw angle sensor configured to detect a turn of a known yaw angular displacement or reference yaw angle to trigger the detection of the second roll angle at the corresponding second point of the path plan of the vehicle, or its implement, based on the estimated current position and to trigger the evaluation of if the roll angle delta is greater than a reference roll value.

19. The system according to claim 11 further comprising:
the electronic data processor configured to obtaining reference roll sensor data from a location-determining receiver for the evaluation period, when the vehicle, or its implement, executes a next turn of known yaw angular displacement; and
the electronic data processor configured to calibrate the roll sensor with the obtained reference roll sensor data.

20. The system according to claim 11 further comprising:
the electronic data processor configured to obtain, from a data storage device, reference roll sensor data associated with the corresponding first point and the second point that was stored as last or most recent reference roll sensor data from the location-determining receiver when the vehicle, or its implement, is associated with previous execution of the path plan of the vehicle.

21. A method for detection of roll sensor bias an off-road work vehicle, the method comprising:
estimating, by a location-determining receiver, a current position and yaw change of the vehicle or its implement;
detecting, by a roll angle sensor, a first roll data at a corresponding first point of a path plan of the vehicle, or its implement, based on the estimated current position;
detecting, by a roll angle sensor, a second roll data at a corresponding second point of the path plan of the vehicle, or its implement, based on the estimated current position if the estimated yaw change is greater than a target yaw angular displacement;
determining, by an electronic data processor, a roll delta or difference between the first roll data and the second roll data, where the electronic data processor is configured to communicate with the roll angle sensor and the location-determining receiver;
if the roll angle delta is greater than a reference roll value, the electronic data processor is configured to evaluate the roll delta over an evaluation period;
if the roll delta is greater than the reference roll value for a target percentage threshold or target ratio of material turns of the vehicle during the evaluation period, the electronic data processor is configured to designate a roll angle sensor for calibration or recalibration, where each of the material turns are representative of a yaw-reversal turn of the vehicle.

22. The method according to claim 21 further comprising detecting whether the estimated yaw change is indicative of a material turn of approximately one-hundred and eighty degrees (180), plus or minus ten percent.

23. The method according to claim 21 wherein the first roll data and the second roll data comprise roll data selected from the group consisting of roll angle data, roll angular velocity data, and roll angular acceleration data.

24. The method according to claim 8 wherein the reference yaw angle comprises an angle of approximately one-hundred and eighty (180) degrees, plus or minus ten percent.

25. The system according to claim 18 wherein the reference yaw angle comprises an angle of approximately one-hundred and eighty (180) degrees, plus or minus ten percent.

* * * * *